United States Patent
Liu et al.

(10) Patent No.: US 10,129,085 B2
(45) Date of Patent: Nov. 13, 2018

(54) DETERMINING NETWORK CONFIGURATIONS FOR A MODULAR COMPUTING ENTITY

(71) Applicant: Google Inc., Mountain View, CA (US)

(72) Inventors: Eric H C Liu, Redwood City, CA (US); Kevin D. Brune, Maple Valley, WA (US); Yoshimichi Matsuoka, Sunnyvale, CA (US); Gilbert Cabillic, Brece (FR); Gaurav Shah, San Jose, CA (US)

(73) Assignee: Google LLC, Mountain View, CA (US)

( * ) Notice: Subject to any disclaimer, the term of this patent is extended or adjusted under 35 U.S.C. 154(b) by 270 days.

(21) Appl. No.: 15/130,404

(22) Filed: Apr. 15, 2016

(65) Prior Publication Data

US 2017/0302517 A1    Oct. 19, 2017

(51) Int. Cl.
| | |
|---|---|
| *H04L 12/24* | (2006.01) |
| *H04L 12/26* | (2006.01) |
| *H04W 24/02* | (2009.01) |
| *H04W 84/18* | (2009.01) |

(52) U.S. Cl.
CPC ...... *H04L 41/0823* (2013.01); *H04L 41/0853* (2013.01); *H04L 43/0817* (2013.01); *H04L 43/0882* (2013.01); *H04W 24/02* (2013.01); *H04W 84/18* (2013.01)

(58) Field of Classification Search
CPC .......................... H04L 41/823; H04L 43/0882
USPC ................................. 709/220, 200, 224, 219
See application file for complete search history.

(56) References Cited

U.S. PATENT DOCUMENTS

| | | | |
|---|---|---|---|
| 6,069,911 A | 5/2000 | Sealander et al. | |
| 6,282,561 B1 | 8/2001 | Jones et al. | |
| 6,771,595 B1 | 8/2004 | Gilbert et al. | |
| 6,785,889 B1 | 8/2004 | Williams | |
| 6,941,399 B2 | 9/2005 | Lou | |
| 6,961,575 B2 | 11/2005 | Stanforth | |
| 6,968,323 B1 | 11/2005 | Bansal et al. | |
| 6,975,613 B1 | 12/2005 | Johansson | |
| 7,009,939 B2 | 3/2006 | Baker et al. | |
| 7,043,225 B1 | 5/2006 | Patel et al. | |
| 7,058,387 B2 | 6/2006 | Kumar et al. | |
| 7,184,759 B2 | 2/2007 | Date et al. | |
| 7,257,632 B2 | 8/2007 | Zhang et al. | |
| 7,340,759 B1 | 3/2008 | Rodriguez | |
| 7,346,354 B2 | 3/2008 | Patel | |
| 7,463,890 B2 | 12/2008 | Herz et al. | |
| 7,489,656 B2 | 2/2009 | Guo et al. | |
| 7,689,681 B1 | 3/2010 | David | |

(Continued)

FOREIGN PATENT DOCUMENTS

EP    2749200    7/2014

*Primary Examiner* — El Hadji M Sall
(74) *Attorney, Agent, or Firm* — Dority & Manning, P.A.

(57) ABSTRACT

Systems and methods of determining network configurations for a modular computing entity are disclosed. For instance, a desired functionality to be implemented by a modular computing entity can be identified. Capacity data associated with one or more candidate network devices that are available to join a network associated with the modular computing entity is received. A network combination to implement the desired functionality can be determined based at least in part on the received capacity data. The network combination can include at least a subset of the candidate network devices.

20 Claims, 4 Drawing Sheets

(56) References Cited

U.S. PATENT DOCUMENTS

| | | |
|---|---|---|
| 7,720,968 B2 | 5/2010 | Clark, Jr. et al. |
| 7,788,133 B2 | 8/2010 | Delenda |
| 8,027,684 B2 | 9/2011 | Gupta et al. |
| 8,028,057 B2 | 9/2011 | David |
| 8,156,500 B2 | 4/2012 | Helander |
| 8,185,909 B2 | 5/2012 | Sigal et al. |
| 8,249,984 B2 | 8/2012 | Dawson et al. |
| 8,276,143 B2 | 9/2012 | Vengerov et al. |
| 8,296,770 B2 | 10/2012 | Ohno |
| 8,320,414 B2 | 11/2012 | Dawson et al. |
| 8,355,670 B2 | 1/2013 | White |
| 8,424,007 B1 | 4/2013 | Hernacki et al. |
| 8,520,535 B2 | 8/2013 | Dawson et al. |
| 8,667,065 B1 | 3/2014 | Odom |
| 8,694,968 B2 | 4/2014 | Eteminan et al. |
| 8,730,994 B2 | 5/2014 | Kannan et al. |
| 8,782,211 B1 | 7/2014 | Sharma |
| 9,003,039 B2 | 4/2015 | Amorim |
| 9,015,708 B2 | 4/2015 | Choudhury et al. |
| 9,031,531 B2 | 5/2015 | Miluzzo et al. |
| 2002/0058499 A1 | 5/2002 | Ortiz |
| 2003/0139199 A1 | 7/2003 | Kinnula et al. |
| 2003/0217129 A1 | 11/2003 | Knittel et al. |
| 2004/0111308 A1 | 6/2004 | Yakov |
| 2004/0128262 A1 | 7/2004 | Nafousi |
| 2004/0156312 A1 | 8/2004 | Salonidis et al. |
| 2004/0165548 A1 | 8/2004 | Backes |
| 2004/0203820 A1 | 10/2004 | Billhartz |
| 2006/0007955 A1 | 1/2006 | Kotzin |
| 2006/0150244 A1 | 7/2006 | Klein et al. |
| 2006/0167784 A1 | 7/2006 | Hoffberg |
| 2007/0230421 A1 | 10/2007 | Roadknight |
| 2007/0294692 A1 | 12/2007 | Zhao et al. |
| 2008/0040481 A1 | 2/2008 | Joshi et al. |
| 2008/0298284 A1 | 12/2008 | Dawson et al. |
| 2008/0298314 A1 | 12/2008 | Dawson et al. |
| 2008/0300890 A1 | 12/2008 | Dawson et al. |
| 2008/0301017 A1 | 12/2008 | Dawson et al. |
| 2008/0313642 A1 | 12/2008 | Karaoguz et al. |
| 2009/0025004 A1 | 1/2009 | Barnard et al. |
| 2009/0180430 A1 | 7/2009 | Fadell |
| 2009/0228888 A1 | 9/2009 | Vengerov et al. |
| 2009/0271324 A1 | 10/2009 | Jandhyala et al. |
| 2010/0223385 A1 | 9/2010 | Gulley et al. |
| 2010/0251259 A1 | 9/2010 | Howard |
| 2010/0332262 A1 | 12/2010 | Horvitz et al. |
| 2011/0288905 A1 | 11/2011 | Mrakas |
| 2011/0320233 A1 | 12/2011 | Arnette et al. |
| 2012/0079097 A1 | 3/2012 | Gopisetty et al. |
| 2012/0254965 A1 | 10/2012 | Parker |
| 2012/0324111 A1 | 12/2012 | Barzel et al. |
| 2013/0042004 A1 | 2/2013 | Boss et al. |
| 2014/0067496 A1 | 3/2014 | Buswell |
| 2014/0133407 A1 | 5/2014 | Hassan et al. |
| 2014/0195683 A1 | 7/2014 | Ammerman, III et al. |
| 2014/0222941 A1 | 8/2014 | Rabone et al. |
| 2014/0307635 A1 | 10/2014 | Agrawal et al. |
| 2015/0026336 A1 | 1/2015 | Suchter et al. |
| 2015/0067022 A1 | 3/2015 | Subbiah |
| 2015/0074635 A1 | 3/2015 | Margiotta et al. |
| 2015/0126192 A1* | 5/2015 | Huang .................. H04W 36/22 455/436 |
| 2015/0195011 A1 | 7/2015 | Birgel et al. |
| 2015/0206228 A1 | 7/2015 | Perez et al. |
| 2016/0192346 A1* | 6/2016 | Chien .................. H04W 8/186 370/329 |

* cited by examiner

DETERMINING NETWORK CONFIGURATIONS FOR A MODULAR COMPUTING ENTITY

FIELD

The present disclosure relates generally to modular electronic devices, and more particularly to determining network combinations associated with a modular computing entity.

BACKGROUND

Modular systems such as a modular electronic device can have multiple different modular electronic components, which can be referred to as "modules." Modules can be removable, replaceable, and/or interchangeable. In general, different modules of a modular device or system can be capable of performing different functions, including a specialized function and/or one or more general functions.

As an example, specialized modules can perform one or more specific functions using one or more specific resources. Examples of specialized modules include a camera module, a battery module, or other module configured to perform a particular task. Thus, in some examples, the specific functions can include capturing an image, supplying power, or performing a specific function using special hardware (e.g., performing a cryptographic function, a graphics processing function, etc.).

Other modules can have the capability to perform general functions using their general resources, such as a memory and a processor. For example, modules can have the ability to communicate with an external module or device (e.g., through a hardwired connection or using a wireless connection). Examples of general functions include performing a processing task, storing data in memory, or utilizing communication bandwidth.

Modules can be combined with other modules or devices. In some examples, such combination can utilize physical combination, for example, by attaching modules to each other or a common structure. For example, a processing module from a modular phone can be removably physically combined with an interface module (e.g., HDMI or USB) to provide video-playback functionality. In other examples, combinations of modules can include physically unconnected devices, such as, for example, modules that are communicatively connected over one or more wireless communication links.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of determining a network configuration for a modular computing entity. The method includes identifying, by one or more computing devices, a desired functionality to be implemented by a modular computing entity. The method further includes receiving, by the one or more computing devices, capacity data associated with one or more candidate network devices that are available to join a network associated with the modular computing entity. The method further includes determining, by the one or more computing devices, a network combination to implement the desired functionality based at least in part on the received capacity data. The network combination includes at least a subset of the candidate network devices.

Other example aspects of the present disclosure are directed to systems, apparatus, tangible, non-transitory computer-readable media, user interfaces, memory devices, and electronic devices for determining network configurations associated with a modular computing entity.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
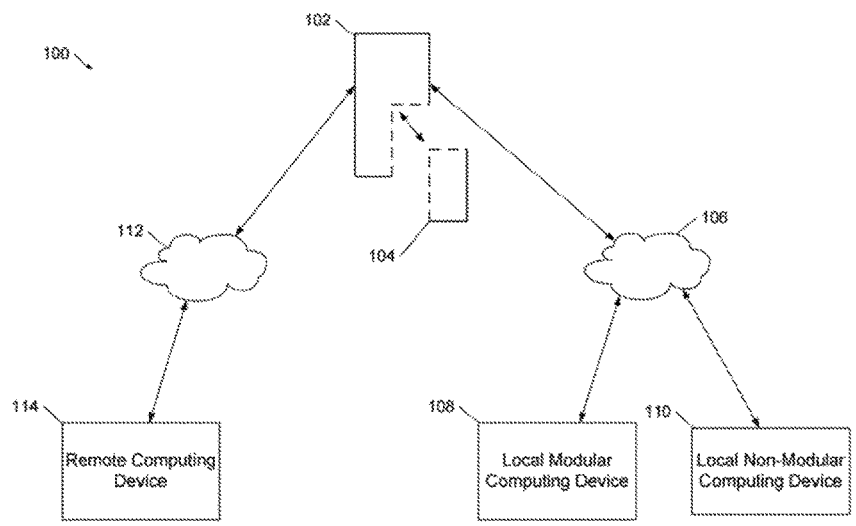
FIG. 1 depicts an overview of an example modular computing entity according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to determining network configurations for a modular computing entity. In particular, the present disclosure relates to ad hoc combinations of computing devices or components that can sense each other, connect, and share functionality, for instance, to perform computing tasks. As an example, computing devices or components can discover each other's presence and availability, and can advertise their own availability and/or capabilities. Such computing devices or components can negotiate the use of resources, identify tasks suitable for a modular computing entity associated with a modular network environment, and/or assign or allocate tasks using available resources to perform the tasks.

More particularly, example aspects of the present disclosure are directed to determining and/or establishing ad hoc combinations of available computing devices to perform one or more computing tasks. For instance, a desired functionality associated with a modular computing entity can be identified. Capacity data associated with one or more candidate network devices that are available to join a network to be associated with a modular computing entity can be received. The capacity data can include one or more capabilities of the candidate network device(s) and/or one or more available resources of the candidate network device(s). A network combination to implement the desired functionality can then be determined based at least in part on the capacity data. The network combination can include at least a subset of candidate network devices. The modular computing entity can be formed by establishing an ad hoc network and joining the candidate network devices of the network combination to the network.

A set of candidate network devices available to join a network and to contribute functionality to a modular computing entity, for instance, via network communication can be identified. For instance, a candidate network device can be a computing device, computing component, modular computing device, modular component, module, and/or any other suitable device or component capable of contributing functionality to a modular computing entity. In some implementations, the candidate network devices can include one or more smartphones, tablets, laptop computing devices, desktop computing devices, wearable computing devices, and/or various other suitable computing or electronic devices. In some implementations, the candidate network devices can include one or more modules, such as one or more modular processing components, modular memory components, modular power components, modular input/output components, and/or various other suitable modules.

As indicated one or more candidate network devices can be joined to an ad hoc combination of devices to form a modular computing entity. The ad hoc combination can communicate via a network, such as an ad hoc wireless network. In some implementations, the modular computing entity can be formed based at least in part on the capabilities and/or available resources of the candidate network devices. For instance, each candidate network device can advertise or otherwise broadcast capacity data associated with the candidate network device. In some implementations, the capacity data can be broadcast on a periodic basis. In some implementations, the capacity data may be broadcast in response to a request for capacity data from a computing device.

The capacity data can include identifying data associated with the candidate network device. The capacity data can further include data indicative of one or more capabilities and/or available resources of the candidate network device. For instance, the capabilities of the candidate network device may include functionality that the device is capable of implementing. In some implementations, the capabilities may further describe various metrics associated with the implementation of the functionality, such as bandwidth data, packet reception data, latency data, quality of service data, and/or other suitable data. The available resources can include processing resources, memory resources, battery resources, communication resources and/or various other suitable resources. The available resources may include a total amount of available resources of the candidate network device and/or an amount of resources that the candidate network device is willing to provide. The data indicative of the available resources may include a resource allocation schedule specifying one or more time periods in which device resources will be available or unavailable. In some implementations, the capacity data can include a predicted future capacity to perform one or more tasks. For instance, a future availability of modular combinations and/or a future availability of computing resources can be predicted and used in determining future tasks to be performed.

A network combination can be determined based at least in part on the received capacity data. In particular, the network combination can be determined based at least in part on the capabilities and/or available resources of the candidate network devices available to join the network. The network combination can include at least a subset of the candidate network devices. In this manner, the network combination can be determined to provide a desired functionality, and the at least a subset of candidate network devices can include candidate network devices that can contribute resources to achieve the desired functionality. For instance, in some implementations, determining a network combination can include determining a set of resources required to implement the desired functionality. One or more candidate network devices can then be selected for the network combination based at least in part on the received capacity data and the determined required resources. For instance, the received capacity data can be analyzed in light of the determined required resources to select one or more candidate network devices that collectively have available the resources required to implement the desired functionality.

In some implementations, the desired functionality can be a general functionality. In some implementations, the desired functionality can be determined or identified based at least in part on one or more computing tasks to be performed. The one or more tasks can be requested by a user. For instance, a user may provide an input to a computing device indicative of a requested task to be performed by the computing device. One or more subtasks or tasklets associated with the computing task can be determined. For instance, the subtasks can be operations to be performed in service of performing the computing task. The computing device may further determine a set of resources and/or capabilities required to perform the computing task and/or subtasks. For instance the set of resources may include processing resources, memory resources, battery resources, communication resources and/or various other suitable resources required to perform a computing task. In such implementations, the desired functionality can be functionality associated with performing the one or more identified computing tasks and/or subtasks. In this manner, the desired functionality can be determined based at least in part on the identified computing tasks. For instance, the desired functionality can be functionality required to perform the one or more computing tasks and/or subtasks.

In some implementations, the desired functionality can be determined based at least in part on the capacity data of the candidate network devices. For instance, the desired functionality can be determined or identified based at least in part on the capabilities and/or available resources of the candidate network devices available to join the network. In this manner, the desired functionality can be determined so that the candidate network devices are collectively capable of implementing the desired functionality. In some implementations, an initial desired functionality may be adjusted based at least in part on the capacity data of the candidate network devices. For instance, an initial desired functionality determined without knowledge of the capacity data of the candidate network devices can be adjusted to an updated desired functionality that the candidate network devices are collectively capable of implementing.

In some implementations, the network combination can be determined based at least in part on an efficiency with which the candidate network devices in the network combination can implement the desired functionality. For instance, the network combination may be determined based at least in part on a speed with which the functionality can be implemented, an amount of resources required to implement the functionality, and/or other suitable metrics. As an example, if multiple combinations of devices can be configured to implement the desired functionality, the network combination can be the combination of devices than can implement the desired functionality in the most efficient manner.

Once the network combination is determined, an ad hoc network can be created or otherwise established. In alternative implementations, the network can be created or otherwise established prior to determination of the network combination. For instance, the network can be a wireless network. One or more invitations to join the network can be provided to the at least a subset of candidate network devices of the network combination. The at least a subset of candidate network devices can then be joined to the network to form the modular computing entity. In some implementations, a candidate network device may refuse to join the network. For instance, the candidate network device may provide a signal indicative of a refusal to join the network. In such scenario, the refusing network device may be removed from the network combination, and one or more additional candidate network devices can be added to the network combination. The additional network devices may be determined based at least in part on the capacity data of the additional network devices. One or more invitations to join the network may be provided to the additional network devices.

In some implementations, a provision of resources by the candidate network devices of the network combination may be negotiated. For instance, an amount of resources that the candidate network device is willing to provide may be negotiated. As another example, a cost of the provision of resources may be negotiated. For instance, a particular price can be offered to a candidate network device for provision of a set of resources. In some implementations, the candidate network device can advertise a cost of resources. The negotiation can result in an agreed upon cost or fee exchanged between devices for the provision of resources by a device.

With reference now to the figures, example aspects of the present disclosure will be discussed in greater detail. For instance, FIG. 1 depicts a block diagram of an example system 100 that includes a modular electronic device 102 participating in an ad hoc combination of devices on a wireless network 106 according to example embodiments of the present disclosure. For instance, the ad hoc combination can act as a modular entity in performing one or more desired tasks or operations. The example modular electronic device 102 includes one or more electronic modules that can be removably coupled to the modular electronic device 102. Each module of the modular electronic device 100 can include and provide a particular set of capabilities based on its own respective on-board components, including processing, memory storage, etc. A single representative example electronic module 104 is illustrated in FIG. 1 for the purposes of explanation. However, the modular electronic device 102 can have any number of electronic modules. In particular, the number of electronic modules included in the modular electronic device 102 can change over time as modules are swapped in and out of the device 102.

According to aspects of the present disclosure, the modular electronic device 102 is capable of establishing and/or participating in a modular entity via an ad hoc combination of modules and other devices that can sense each other, connect, and share functionality. For example, the modular entity can include a plurality of modules that are each physically coupled to the device 102. Alternatively or additionally to the physically coupled modules, the modular entity can include one or more additional devices (e.g., devices 108 and 110) that are communicatively coupled to the modular electronic device 102 over one or more wireless networks 106. The additional devices accessible over the network can include other modular devices (e.g., device 108) and/or non-modular devices (e.g., device 110). Non-modular device 110 can include a smartphone, a tablet computer, a laptop computer, a desktop computer, a smart appliance, an embedded computing device, or other computing devices. Devices can be user-controlled, autonomous, or some combination thereof.

The wireless network 106 can be one network (e.g., a Wi-Fi network) or a combination of networks (e.g., a combination of a local area Wi-Fi network, a device-specific personal area network, a piconet, a module-to-module mesh network, etc.). In particular, modules can be capable of communicating with other modules using a wireless communication interface such as RF communication, Near-Field Communication, Bluetooth, Wi-Fi, other wireless communication protocols, or some combination thereof. Thus, modules can be combined logically to perform tasks without a physical connection between the modules. The modular electronic device 102 can be further capable of communicating with one or more physically remote devices 114 (e.g., a server computing device) over a wide area network 112 (e.g., the Internet).

Additional computing devices can enter and depart the ad hoc combination and/or the modular entity over time. Further, different modules can be owned by different entities in an environment. For example, modules can be part of multiple devices that belong to the same user or to different users. As an example, in a conference room, the videoconference system can offer its modules to users within the room.

In one particular example, a user of the modular electronic device 102 can visit a coffee shop. Additional devices (e.g., devices 108 and 110) can also be located in the coffee shop. For example, the additional devices can include other customers' smartphones, other customers' laptops, a transaction processing device (e.g., "cash register"), or any other computing devices located within the coffee shop or otherwise within range to engage in communications. Thus, as customers enter and leave the coffee shop, their respective devices can join and depart the ad hoc combination of devices available over the network 106. Likewise, as the user of the modular electronic device 102 leaves the coffee shop and visits other locations (e.g., a transit station), the modular electronic device 102 can be exposed to many different devices that are respectively located at such other locations (e.g., the transit station).

According to aspects of the present disclosure, each module of the device 100 can provide or enable different functionality based on its connection in different device environments. Similarly, if other modular electronic devices (e.g., modular device 108) are communicatively connected over a network, the modules of such devices can each provide or enable their own respective functionalities. Likewise, non-modular devices can provide or enable different functionalities as well.

As an example, the module 104 of the modular device 102 can perform particular tasks when connected to the device 102. For example, the example module 104 can provide processing functionality, memory storage functionality, or other specific functions based on its particular hardware and/or software.

Further, each module can be removed from the modular device 102 and connected in a different environment to perform different tasks. For example, the module 104 can perform particular tasks if it is connected to a different device, or it can be a module in a connected network of modules that can create an ad hoc higher level functionality.

The tasks to be performed by a module or modular entity can be defined in various ways. In some instances, a user can indicate particular tasks. For example, a user can specify particular tasks to perform using available capabilities of the module and other connected modules/devices. For instance, a user may indicate or specify a particular task to be performed through interaction with a user interface associated with a module or combination of modules. In some cases, the module 104 or modular device 102 can output (e.g., display) to the user the capabilities it and other connected modules have available.

In one example, the module 104 of the modular device 102 can be a cellular communication module. The cellular communication module can offer to provide cellular communication capability to a different device (e.g., device 110) that can lack such capability. In another example, if the modular device 102 has a low battery capacity, it can offload a power-intensive task to another device (e.g., device 110).

In yet further examples, a local or remote server (e.g., device 114) can offer its functionality to devices in a modular manner. For example, a server with high processing capacity can be accessed and used by the module 104 or modular device 102 to carry out processor-intensive tasks.

To enable the ad-hoc combinations described above, modules can be enabled to: discover each other's presence and availability; advertise their own availability, capabilities, and price; negotiate use of other modules' resources; identify tasks that can be suitable for a current environment that includes certain modules; and/or partition tasks such that parts of the task can be performed by the different modules to complete the task.

Figure 2:
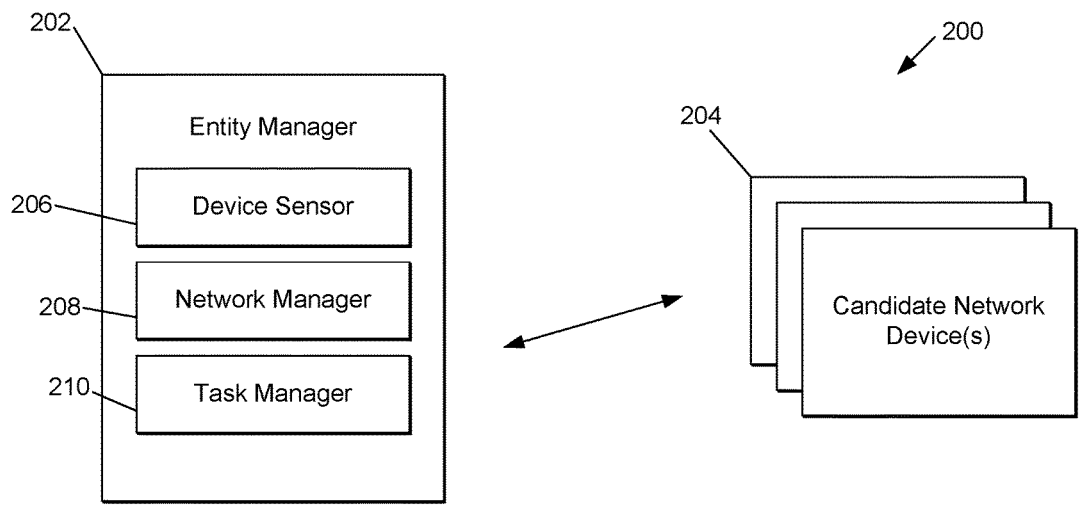
FIG. 2 depicts an over view of an example modular computing entity according to example embodiments of the present disclosure.

As indicated above, in some implementations, a modular device or other computing device can determine and/or facilitate creation of a modular entity. For instance, FIG. 2 depicts an example system 200 for determining a network configuration of devices according to example embodiments of the present disclosure. As shown, system 200 includes an entity manager 202 and one or more candidate network devices 204. Entity manager 202 can be configured to detect candidate network device(s) 204 and to determine a network combination based at least in part on capacity data associated with candidate network device(s) 204.

In particular, entity manager 202 can be any suitable computing device configured to manage or regulate a modular entity. For instance entity manager 202 can be a modular computing device, such as a modular smartphone or other modular computing device capable of interfacing with and implementing functionality from one or more modular components. As another example, entity manager 202 can be a non-modular computing device, such as a laptop, desktop, smartphone, wearable computing device, tablet, or other suitable computing device. In some implementations, entity manager 202 can correspond to modular device 102 of FIG. 1.

Candidate network device(s) 204 can include one or more modules or devices that are capable of joining or otherwise contributing functionality to a modular entity. In some implementations, the candidate network device(s) 204 can correspond to module 104, remote computing device 114, local modular computing device 108, and/or local non-modular computing device 110 of FIG. 1. For instance, candidate network device(s) 204 can include modules or computing devices that are in communicative range of entity manager 202, and are available to join the modular entity associated with entity manager 202. Candidate network device(s) 204 can broadcast or advertise capacity data associated with the respective candidate network device(s) 204. In this manner, the presence and/or capacity data of candidate network device(s) 204 can be sensed or otherwise detected by entity manager 202.

As indicated above, the capacity data can indicate one or more capabilities and/or available resources associated with the candidate network device. For instance, the capacity data can include processing capabilities or resources, memory capabilities or resources, power capabilities or resources, etc. In some implementations, the capacity data can include various metrics indicative of an expected performance by the module in implementing some functionality. For instance, such metrics can include bandwidth data, packet reception data, latency data, quality of service data, and/or other suitable data. In some implementations, the available resources may include a total amount of available resources or an amount of resources that the candidate network device is willing to provide.

Entity manager 202 includes or can implement functionality associated with a device sensor 206, a network manager 208, a task manager 210, and/or other suitable functionality. Device sensor 206 can be configured to sense, detect or otherwise obtain data indicative of candidate network device(s) 204. For instance, such data indicative of candidate network device(s) 204 can include an indication of a presence of candidate network device(s) 204 and/or the capacity data associated with the respective candidate network devices. In some implementations, device sensor 206 can broadcast a request for capacity data, such that any candidate network device in range of the broadcasted request can respond.

Network manager 208 can be configured to determine a network combination of modules or devices based at least in part on the received capacity data of candidate network device(s) 204. For instance, network manager 208 can be configured to determine a combination of modules or devices from candidate network device(s) 204 to perform some desired functionality. In this manner, network manager 208 can select one or more candidate network devices to join the network combination. As indicated above, the desired functionality can be associated with one or more particular tasks or operations to be performed, or the desired functionality can be a general functionality not associated with a particular task or operation. In some implementations, the desired functionality can be determined responsive to a user interaction with entity manager 202 indicative of a request to perform a task or operation.

In some implementations, network manager 208 can determine or obtain a set of resources required to perform the desired functionality. For instance, the set of resources can include processing resources, memory resources, power resources, I/O resources, communication resources or other resources required to perform the desired functionality. Network manager 208 can then survey or analyze the received capacity data of candidate network device(s) 204 to determine a network combination capable of performing the desired functionality.

In some implementations, network manager 208 can determine a desired functionality based at least in part on the capacity data received from candidate network device(s) 204. For instance, the desired functionality can be determined based at least in part on capabilities and/or resources that are available to the modular entity, such that some combination of candidate network device(s) 204 and entity manager 202 are capable of implementing the desired functionality. For instance, the desired functionality can be the best general computing functionality capable of being implemented by candidate network device(s) 204 and entity manager 202. In this manner, the network combination of devices can include the combination of candidate network devices that provide the best general computing functionality. In some implementations, the desired functionality can be adjusted or modified based at least in part on the received capacity data. For instance, an initial desired functionality can be adjusted based at least in part on the resources and/or capabilities available to the modular entity. In this manner, the initial desired functionality can be adjusted such that some combination of the candidate network device(s) 204 and the entity manager 202 can implement the desired functionality.

In some implementations, network manager 208 can be configured to determine the network combination based at least in part on an expected efficiency with which the network combination will implement the desired functionality. For instance, network manager 208 can determine the network combination based at least in part on the performance metrics associated with the received capacity data. For instance, in a scenario wherein multiple ad hoc combinations of available devices are capable of implementing the desired functionality, the expected efficiencies with which the functionality will be implemented can be used to determine the network combination.

Network manager 208 can further be configured to establish a network, such as an ad hoc wireless network, and to provide invitations to join the network to the candidate network devices selected to the network combination. Network manager 208 can facilitate joining of the network by the selected network devices. In this manner, the modular entity may be formed at least in part by one or more selected network devices joining the network. In some implementations, one or more selected network devices may refuse to join the network or otherwise be unable to join. In such implementations, network manager 208 may select one or more additional candidate network devices to replace the non-joining devices, and may provide invitations to join the network to the one or more additional candidate network devices.

Entity manager 202 can further include a task manager 210. Task manager 210 can be configured to manage, allocate, or regulate one or more tasks or operations to be performed by the modular entity. For instance, task manager 210 can be configured to determine one or more tasks to be performed, allocate one or more tasks among the modular entity, generate one or more subtasks to be performed in service of a global task, etc. For instance, in some implementations, task manager 210 can be configured to determine one or more computing tasks to be performed based at least in part on the capacity data received from candidate network device(s) 204. In some implementations, task manager 210 can be configured to determine the desired functionality, for instance, based at least in part on the capacity data and/or on a user input indicative of a task to be performed.

In this manner, task manager 210 can monitor currently available resources and capabilities (e.g. capacity data) and can compare such currently available resources to required resources associated with various tasks or operations. As an example, when the resources required for performance of one or more tasks become available (e.g., as various candidate network devices become available or unavailable), task manager 210 can identify that the one or more tasks are capable of being performed by the currently available resources.

In some implementations, task manager 210 can determine a set of resources required to implement a desired functionality or to perform a computing task, and can provide the set of resources to network manager 206. In some implementations, task manager 210 can be configured to divide a global task into a plurality of subtasks, or otherwise determine one or more subtasks to be performed in service of the global task. In some implementations, the desired functionality and/or the resources required to implement the desired functionality can be determined based at least in part on the various subtasks.

Once the modular entity is formed, task manager 210 can allocate various tasks or subtasks among the devices of the modular entity. For instance, the allocation can be determined based at least in part on the capacity data of the modular entity devices.

In some implementations, task manager 210 can perform the above described process automatically. As an example, task manager 210 can continuously monitor resource availability and autonomously manage task performance according to a set of guidelines. For example, task manager 210 can determine appropriate tasks to perform for the available capabilities based on predefined goals or preferences specified by a user, default operations, or other settings or guidelines.

In other implementations, task manager 210 can recognize that one or more tasks are capable of being performed and can notify a user of the device regarding such capability. The user can select one of the performable tasks and task manager 210 can cause the task to be performed (e.g., by instructing or otherwise cooperating with resource negotiator 255 to negotiate use of the required resources). Thus, task manager 210 can notify the user of the availability of resources and permit the user to choose a particular task to perform.

Figure 3:
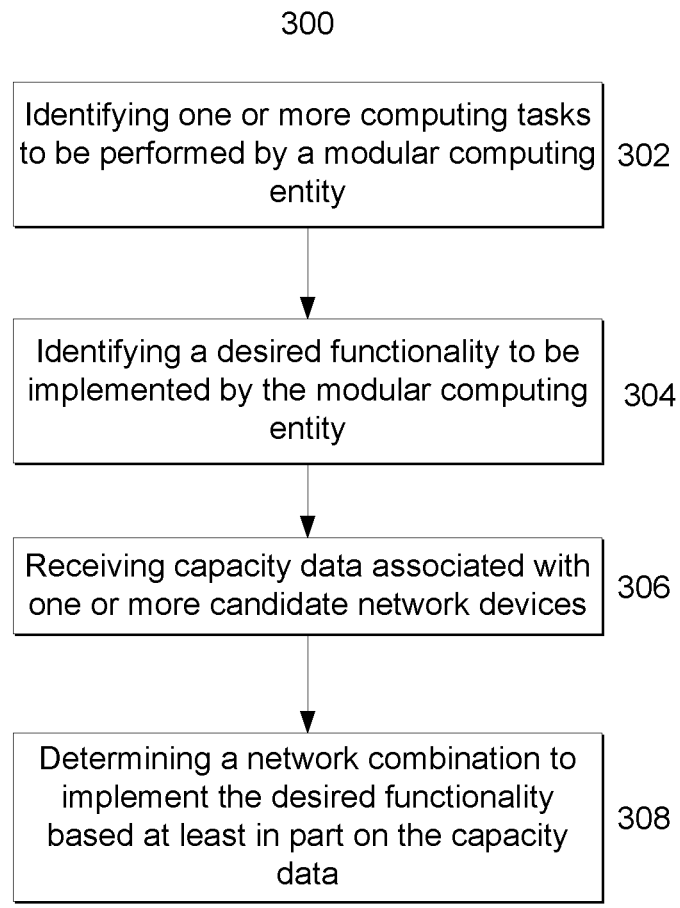
FIG. 3 depicts a flow diagram of an example method of determining a network configuration associated with a modular computing entity according to example embodiments of the present disclosure.

FIG. 3 depicts a flow diagram of an example method (300) of determining a network configuration associated with a modular computing entity according to example embodiments of the present disclosure. Method (300) can be implemented by one or more computing devices, such as one or more of the computing devices depicted in FIG. 5. In particular implementations, the method (300) can be implemented by the device sensor 206, network manager 208, and/or task manager 210 depicted in FIG. 2. In addition, FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (302), method (300) can include identifying one or more computing tasks or operations to be performed by a modular computing entity. As indicated, the modular entity can include a plurality of devices or components configured to communicate and share functionality via a physical connection and/or a wireless connection, such as using an ad hoc wireless network. For instance, the modular entity can be established by an entity manager configured to facilitate creation of the modular entity. The one or more computing tasks can be user requested tasks, or can be determined based at least in part on computing resources or capabilities currently available. As indicated, in some implementations, the computing tasks can be determined based at least in part on a prediction of computing resources or capabilities that will become available at a future time.

At (304), method (300) can include identifying a desired functionality to be implemented by the modular computing entity. In some implementations, the desired functionality can be determined based at least in part on the identified computing tasks or operations. For instance, the desired functionality can be a functionality that allows for such computing tasks to be performed. In some implementations, the desired functionality can be associated with a general functionality, such a general computing functionality. In other implementations, the desired functionality can be associated with a set of rules or guidelines, for instance, as specified by a user. For instance, the rules or guidelines may dictate an implementation of the best general computing functionality currently available. As another example, the rules or guidelines may indicate one or more areas or categories of functionality to be implemented, such as processor intensive functionality, power saving functionality, video playback functionality, internet capable functionality, etc. In this manner, the desired functionality can be determined in accordance with such rules or guidelines.

At (306), method (300) can include receiving capacity data associated with one or more candidate network devices. The capacity data can be data broadcast or advertised by a number of candidate network devices available to join the modular entity, for instance, via communication over an ad hoc wireless network. In this manner, the capacity data can be received from one or more candidate network devices in a broadcast range. The capacity data can be indicative of one or more capabilities and/or available resources associated with the broadcasting candidate network device(s).

As indicated above, in some implementations, the capacity data can be used to identify one or more computing tasks and/or the desired functionality. For instance, the computing tasks and/or desired functionality can be determined based at least in part on the available resources or capabilities associated with the candidate network device(s). In this manner, in such implementations, such computing tasks and/or desired functionality can be determined or identified subsequent to reception of the capacity data.

At (308), method (300) can include determining a network combination to implement the desired functionality based at least in part on the received capacity data. For instance, the network combination can include at least a subset of the candidate network device(s). The network combination can be determined to form a modular entity capable of implementing the desired functionality. For instance, the network combination can include the entity manager and one or more candidate network devices collectively having sufficient resources to implement the desired functionality. As indicated above, in some implementations, the network combination can be determined based at least in part on an expected efficiency with which the desired functionality will be implemented.

Figure 4:
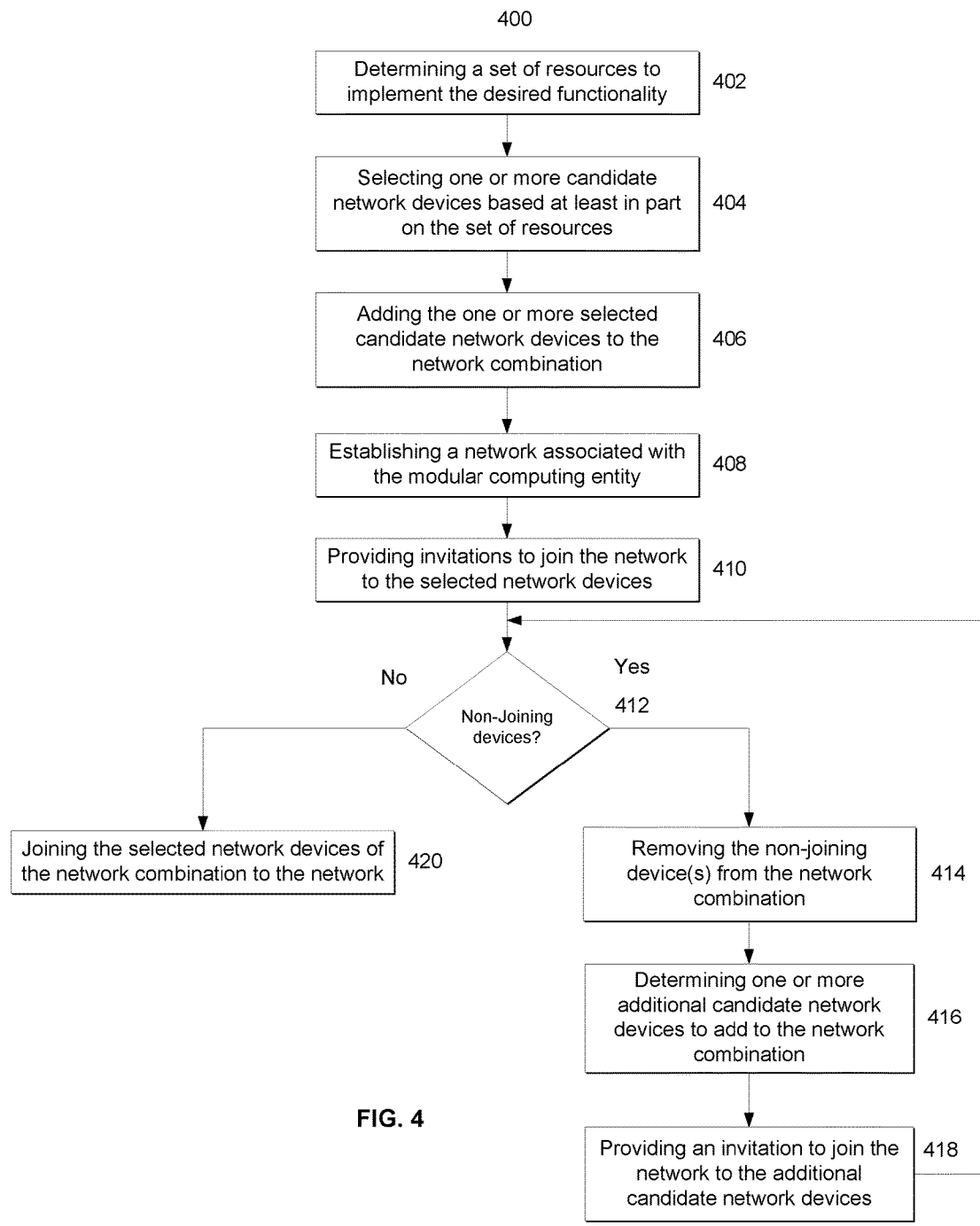
FIG. 4 depicts a flow diagram of an example method of establishing a network to implement desired functionality according to example embodiments of the present disclosure.

FIG. 4 depicts a flow diagram of an example method (400) of establishing a modular entity according to example embodiments of the present disclosure. Method (400) can be implemented by one or more computing devices, such as one or more of the computing devices depicted in FIG. 5. In particular implementations, the method (400) can be implemented by the device sensor 206, network manager 208, and/or task manager 210 depicted in FIG. 2. In addition, FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (402), method (400) can include determining a set of resources to implement the desired functionality. For instance, the set of resources can include processing resources, memory resources, power resources, I/O resources, communication resources, etc. In some implementations, the set of resources can be determined without considering currently available resources or capabilities. In other implementations, the set of resources can be determined based at least in part on capacity data received from one or more candidate network devices. For instance, the resources can be determined in accordance with available resources and/or capabilities, such that a modular computing entity created using the candidate network devices would be capable of implementing the desired functionality.

At (404), method (400) can include selecting one or more candidate network devices based at least in part on the set of resources. The candidate network devices can be selected based at least in part on the respective available resources and/or capabilities of the candidate network devices. In this manner, the candidate network devices can be selected to collectively implement the desired functionality. At (406), method (400) can include adding the one or more selected candidate network devices to the network combination.

At (408), method (400) can include establishing a network, such as an ad hoc wireless network. The network can be used to facilitate creation of the modular computing entity. In some implementations, the network can be a wireless mesh network implemented using various suitable networking techniques.

At (410), method (400) can include providing invitations to join the network to the selected network devices. At (412), method (400) can include determining whether any of the selected network devices cannot or will not join the established network. For instance, a selected network device can be unable to join the network, or a selected network device can decline the invitation and refuse to join the network. If there are one or more non-joining devices, at (414), method (400) can include removing the non-joining devices from the network combination. At (416), method (400) can include determining one or more additional candidate network devices to add to the network combination. For instance, the one or more additional devices can be candidate network devices that were not previously selected to join the network. Such additional devices can be determined based at least in part on their capacity data. At (418), method (400) can include providing an invitation to join the network to the additional candidate network devices.

Referring back to (412), if there are no non-joining devices, at (420), method (400) can include joining the selected network devices to the established network.

Figure 5:
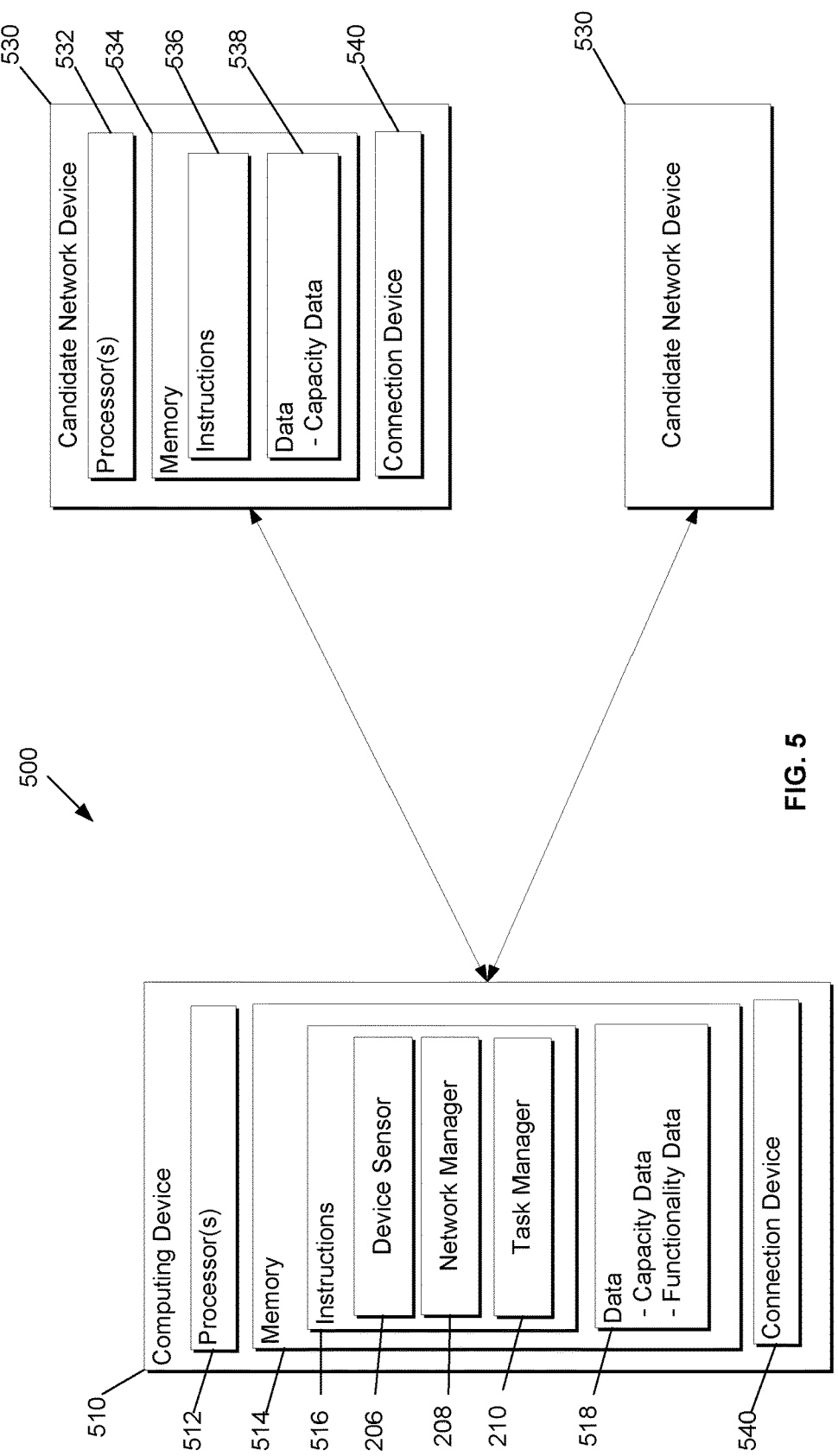
FIG. 5 depicts an example system according to example embodiments of the present disclosure.

FIG. 5 depicts an example computing system 500 that can be used to implement the methods and systems according to example aspects of the present disclosure. The system 500 can be implemented using other suitable architectures, such as a single computing device.

The system 500 includes a computing device 510. The modular computing device 510 can be implemented using any suitable computing device(s). In some implementations, computing device 510 can correspond to entity manager 202 of FIG. 2, or other computing device. In some implementations, computing device 510 can be a non-modular computing device. In other implementations, the computing device 510 can be a modular computing device configured to receive one or more modules to add functionality to computing device 510. For instance, a first module may contribute processing resources to computing device 510, while a second module may contribute memory resources. In some implementations, the computing device 510 can have one or more processors 512 and one or more memory devices 514. The computing device 510 can also include a network interface used to communicate with one or more modules or devices over a network. The network interface can include any suitable components for interfacing with one more networks, including for example, transmitters, receivers, ports, controllers, antennas, or other suitable components.

As an example, in implementations, wherein computing device 510 is a modular computing device, computing device 510 may act as a frame or skeleton to facilitate physical connections between computing device 510 and one or more modules. In particular, the frame may include a number of slots or bays into which one or more modules can be removably received. The frame may serve as a backbone or endoskeleton to provide structure and shape to the modular computing device.

The one or more processors 512 can include any suitable processing device, such as a microprocessor, microcontroller, integrated circuit, logic device, or other suitable processing device. The one or more memory devices 514 can include one or more computer-readable media, including, but not limited to, non-transitory computer-readable media, RAM, ROM, hard drives, flash drives, or other memory devices. The one or more memory devices 514 can store information accessible by the one or more processors 512, including computer-readable instructions 516 that can be executed by the one or more processors 512. The instructions 516 can be any set of instructions that when executed by the one or more processors 512, cause the one or more processors 512 to perform operations. For instance, the instructions 516 can be executed by the one or more processors 512 to perform operations associated with a device sensor 206, a network manager 208, a task manager 210, or other operations.

As shown in FIG. 5, the one or more memory devices 514 can also store data 518 that can be retrieved, manipulated, created, or stored by the one or more processors 512. The data 518 can include, for instance, capacity data, functionality data, and other data. The data 518 can be stored in one or more databases. The one or more databases can be connected to the modular computing device 510 by a high bandwidth LAN or WAN, or can also be connected to modular computing device 510 through a network. The one or more databases can be split up so that they are located in multiple locales.

The computing device 510 can exchange data with one or more candidate network devices 530 over the network 540. In some implementations, one or more candidate network devices 530 can be exchange data with computing device 510 through a physical connection. Candidate network devices 530 can correspond to candidate network devices 204 of FIG. 2, or other computing device. Candidate network devices 530 can include one or more modular computing devices, modular components (e.g. modules), and/or non-modular computing devices. Although two candidate network devices 530 are illustrated in FIG. 5, any number of candidate network devices 530 can be connected to the computing device 510. Each of the candidate network devices 530 can include functionality that can be added to computing device 510 when a connection is made between computing device 510 and the candidate network device 530.

Similar to the computing device 510, a candidate network device 530 can include one or more processor(s) 532 and/or a memory 534. The one or more processor(s) 532 can include one or more central processing units (CPUs), graphics processing units (GPUs) dedicated to efficiently rendering images or performing other specialized calculations, and/or other processing devices. The memory 534 can include one or more computer-readable media and can store information accessible by the one or more processors 532, including instructions 536 that can be executed by the one or more processors 532 and data 538. For instance, the memory 534 can store instructions 536 for implementing the systems and methods disclosed herein.

The candidate network devices 530 of FIG. 5 can include various input/output devices for providing and receiving information from a user, such as a touch screen, touch pad, data entry keys, speakers, and/or a microphone suitable for voice recognition. For instance, the candidate network devices 530 can have a display device 535 for presenting a user interface according to example aspects of the present disclosure.

The candidate network devices 530 can also include a network interface used to communicate with one or more remote computing devices (e.g. modular computing device 510) over a network. The network interface can include any suitable components for interfacing with one more networks, including for example, transmitters, receivers, ports, controllers, antennas, or other suitable components.

The network can be any type of communications network, such as a local area network (e.g. intranet), wide area network (e.g. Internet), cellular network, ad hoc wireless network (e.g. mesh network) or some combination thereof. The network can also include a direct connection between a candidate network device 530 and the computing device 510. In general, communication between the computing device 510 and a candidate network device 530 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

In some implementations, computing device 510 and/or candidate network devices 530 can further include one or more connection devices 540 that can facilitate a connection between modular computing device 510 and modular component 530. In various implementations, the connection device(s) 540 can facilitate a physical connection and/or a wireless connection through direct wireless communication and/or communication over the network. For instance, the connection device(s) 540 can include one or more latching structures or other structures configured to secure a physical connection between devices. In some implementations, computing device 510 can include at least one connection device within each of a plurality of bays. As one example, the connection device within each bay can include an.

As described above, in implementations wherein computing device 510 and/candidate network device 530 are modular devices (e.g. modular computing devices, modular components, modules, etc.), the devices may include some combination of components depicted in FIG. 5. For instance, in some implementations, computing device 510 and/or a candidate network device 530 may include a memory device but not a processor. As another example, computing device 510 and/or a candidate network device 530 may include a processor but not a memory device. As yet another example, computing device 510 and/or a candidate network device 530 may or may not include a display or other I/O device. In this manner, the computing device 510 and one or more candidate network devices 530 can be joined to cooperatively operate as a single device by sharing resources to implement a desired functionality.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of determining a network configuration for a modular computing entity, the method comprising:
   identifying, by one or more computing devices, a desired functionality to be implemented by a modular computing entity comprising a first electronic device;
   receiving, by the one or more computing devices, capacity data associated with one or more candidate network devices that are available to join a network associated with the modular computing entity, the one or more candidate network devices comprising at least one modular device that is removably coupled to the first electronic device; and
   determining, by the one or more computing devices, a network combination to implement the desired functionality based at least in part on the received capacity data, the network combination comprising at least a subset of the candidate network devices including the at least one modular device, wherein determining the network combination is based at least in part on the capacity data associated with the at least one modular device.

2. The computer-implemented method of claim 1, further comprising:
   establishing, by the one or more computing devices, the network associated with the modular computing entity; and
   providing, by the one or more computing devices, an invitation to join the network to each of the candidate network devices in the network combination.

3. The computer-implemented method of claim 2, further comprising joining, by the one or more computing devices, each candidate network device in the network combination to the network to form the modular computing entity.

4. The computer-implemented method of claim 2, further comprising:
   receiving, by the one or more computing devices, a refusal to join the network from a candidate network device;
   responsive to receiving the refusal to join the network, determining, by the one or more computing devices, one or more additional candidate network devices to add to the network combination based at least in part on the received capacity data; and
   providing, by the one or more computing devices, an invitation to join the network to the one or more additional candidate network devices.

5. The computer-implemented method of claim 1, wherein the capacity data comprises one or more functions that the one or more candidate network devices are capable of implementing.

6. The computer-implemented method of claim 1, wherein the capacity data comprises one or more available resources comprising a set of computing resources that each candidate network device is willing to provide.

7. The computer-implemented method of claim 1, wherein determining, by the one or more computing devices, a network combination to implement the desired functionality comprises:
   determining, by the one or more computing devices, a set of resources required to implement the desired functionality; and
   selecting, by the one or more computing devices, one or more candidate network devices based at least in part on the set of resources required to perform the one or more identified computing tasks and the received capacity data.

8. The computer-implemented method of claim 1, wherein identifying, by one or more computing devices, a desired functionality of a modular computing entity comprises identifying, by one or more computing devices, one or more computing tasks to be performed by the modular computing entity; and
   wherein the desired functionality is functionality associated with the one or more computing tasks.

9. The computer-implemented method of claim 8, further comprising receiving, by the one or more computing devices, a user input indicative of a request to perform a task; and
   wherein identifying, by one or more computing devices, one or more computing tasks to be performed by the modular computing entity comprises identifying the one or more computing tasks to be performed by the modular computing entity based at least in part on the user input.

10. The computer-implemented method of claim 8, wherein identifying, by one or more computing devices, one or more computing tasks to be performed comprises identifying a general task to be performed and determining one or more subtasks to be performed to achieve the general task.

11. The computer-implemented method of claim 1 further comprising providing, by the one or more computing devices, a request for capacity data to each candidate network device; and
wherein the capacity data is provided to the one or more computing devices in response to the request for capacity data.

12. The computer-implemented method of claim 1, wherein the network is an ad hoc wireless network associated with the modular computing entity.

13. The computer-implemented method of claim 1, further comprising negotiating, by the one or more computing devices, a provision of resources by each candidate network device in the network combination.

14. The computer-implemented method of claim 1, wherein the at least one modular device is configured to contribute functionality to the modular computing entity via network communication.

15. A computing system, comprising:
one or more processors; and
one or more memory devices, the one or more memory devices storing computer-readable instructions that when executed by the one or more processors cause the one or more processors to perform operations, the operations comprising:
identifying a desired functionality to be implemented by a modular computing entity comprising a first electronic device;
receiving capacity data associated with one or more candidate network devices that are available to join a network associated with the modular computing entity, the one or more candidate network devices comprising at least one modular device that is removably coupled to the first electronic device; and
determining a network combination to implement the desired functionality based at least in part on the received capacity data, the network combination comprising at least a subset of the candidate network devices including the at least one modular device, wherein determining the network combination is based at least in part on the capacity data associated with the at least one modular device.

16. The computing system of claim 15, the operations further comprising:
establishing the network associated with the modular computing entity; and
providing an invitation to join the network to each of the candidate network devices in the network combination.

17. The computing system of claim 16, the operations further comprising:
receiving a refusal to join the network from a candidate network device;
responsive to receiving the refusal to join the network, determining one or more additional candidate network devices to add to the network combination based at least in part on the received capacity data; and
providing an invitation to join the network to the one or more additional candidate network devices.

18. One or more tangible, non-transitory computer-readable media storing computer-readable instructions that when executed by one or more processors cause the one or more processors to perform operations, the operations comprising:
identifying a desired functionality to be implemented by a modular computing entity comprising a first electronic device;
receiving capacity data associated with one or more candidate network devices that are available to join a network associated with the modular computing entity, the one or more candidate network devices comprising at least one modular device that is removably coupled to the first electronic device; and
determining a network combination to implement the desired functionality based at least in part on the received capacity data, the network combination comprising at least a subset of the candidate network devices including the at least one modular device, wherein determining the network combination is based at least in part on the capacity data associated with the at least one modular device.

19. The one or more tangible, non-transitory computer-readable media of claim 18, the operations further comprising:
determining a set of resources required to implement the desired functionality; and
selecting one or more candidate network devices based at least in part on the set of resources required to perform the one or more identified computing tasks and the received capacity data.

20. The one or more tangible, non-transitory computer-readable media of claim 18, wherein identifying, by one or more computing devices, a desired functionality of a modular computing entity comprises identifying, by one or more computing devices, one or more computing tasks to be performed by the modular computing entity; and
wherein the desired functionality is functionality associated with the one or more computing tasks.

* * * * *